(12) United States Patent
Acheson et al.

(10) Patent No.: US 7,546,696 B1
(45) Date of Patent: Jun. 16, 2009

(54) INFLATION MECHANISM AND OUTLET VALVE FOR AN ARTICLE OF FOOTWEAR INCORPORATING AN INFLATABLE BLADDER

(75) Inventors: Jeff Acheson, Brookline, MA (US); Mark Busse, Providence, RI (US)

(73) Assignee: Reebok International Ltd., Canton, MA (US)

( * ) Notice: Subject to any disclaimer, the term of this patent is extended or adjusted under 35 U.S.C. 154(b) by 386 days.

(21) Appl. No.: 11/250,613

(22) Filed: Oct. 17, 2005

(51) Int. Cl.
*A43B 13/20* (2006.01)
(52) U.S. Cl. .............................. 36/29; 36/3 R; 36/35 B
(58) Field of Classification Search .................. 36/29, 36/3 R, 3 B, 35 B
See application file for complete search history.

(56) References Cited

U.S. PATENT DOCUMENTS

| | | | | |
|---|---|---|---|---|
| 5,074,765 A | * | 12/1991 | Pekar | ......................... 417/480 |
| 5,113,599 A | | 5/1992 | Cohen et al. | |
| 5,144,708 A | | 9/1992 | Pekar | |
| 5,158,767 A | | 10/1992 | Cohen et al. | |
| 5,253,435 A | | 10/1993 | Auger et al. | |
| 5,257,470 A | | 11/1993 | Auger et al. | |
| 5,343,638 A | | 9/1994 | Legassie et al. | |
| 5,351,710 A | | 10/1994 | Phillips | |
| 5,406,661 A | * | 4/1995 | Pekar | ......................... 5/655.3 |
| 5,435,230 A | | 7/1995 | Phillips | |
| 5,590,696 A | | 1/1997 | Phillips et al. | |
| 5,617,650 A | | 4/1997 | Grim | |
| 5,893,219 A | | 4/1999 | Smith et al. | |
| 5,987,779 A | | 11/1999 | Litchfield et al. | |
| 6,409,486 B1 | * | 6/2002 | Baek | ......................... 417/440 |
| 6,457,262 B1 | | 10/2002 | Swigart | |
| 6,510,624 B1 | | 1/2003 | Lakic | |
| 6,557,274 B2 | * | 5/2003 | Litchfield et al. | ............... 36/88 |
| 6,638,038 B2 | * | 10/2003 | Baek | ......................... 417/440 |
| 6,782,640 B2 | | 8/2004 | Westin | |
| 6,785,985 B2 | | 9/2004 | Marvin et al. | |
| 6,938,360 B2 | * | 9/2005 | Fang et al. | ...................... 36/54 |
| 7,278,445 B2 | * | 10/2007 | Marvin et al. | ............. 137/601.2 |
| 2002/0164257 A1 | * | 11/2002 | Baek | ......................... 417/440 |
| 2004/0003517 A1 | | 1/2004 | Marvin et al. | |
| 2005/0028404 A1 | | 2/2005 | Marvin et al. | |

OTHER PUBLICATIONS

Print out from Website of Vernay Laboratories, Inc. from http://www.vernay.com/beta/products/checkval.htm (publication date unknown; printed on Mar. 16, 2006).

* cited by examiner

*Primary Examiner*—Marie Patterson
(74) *Attorney, Agent, or Firm*—Sterne, Kessler, Goldstein and Fox P.L.L.C.

(57) ABSTRACT

An article of footwear having a fluid system including an inflatable bladder, an inflation mechanism, and a valve for facilitating air movement through the fluid system. In one embodiment, the valve is an outlet valve between the inflation mechanism and the inflatable bladder that includes an umbrella valve. In another embodiment, the valve is an outlet valve between the inflation mechanism and the inflatable bladder wherein a seating of the outlet valve forms a portion of the inflatable bladder and a portion of an inflation chamber of the inflation mechanism. The seating includes a flange for preventing blocked air flow to the valve. In another embodiment, the valve includes an umbrella valve and an inlet filter for keeping particulates from compromising the umbrella valve.

19 Claims, 9 Drawing Sheets

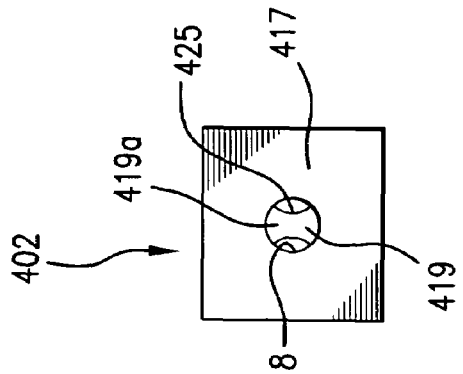
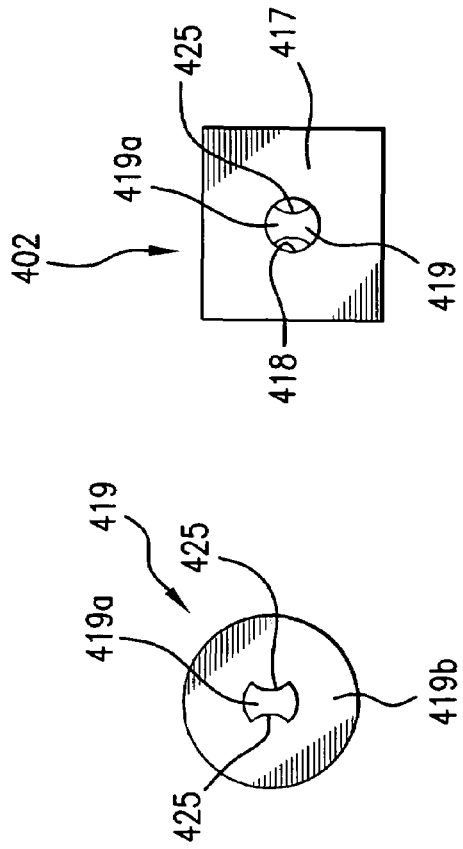
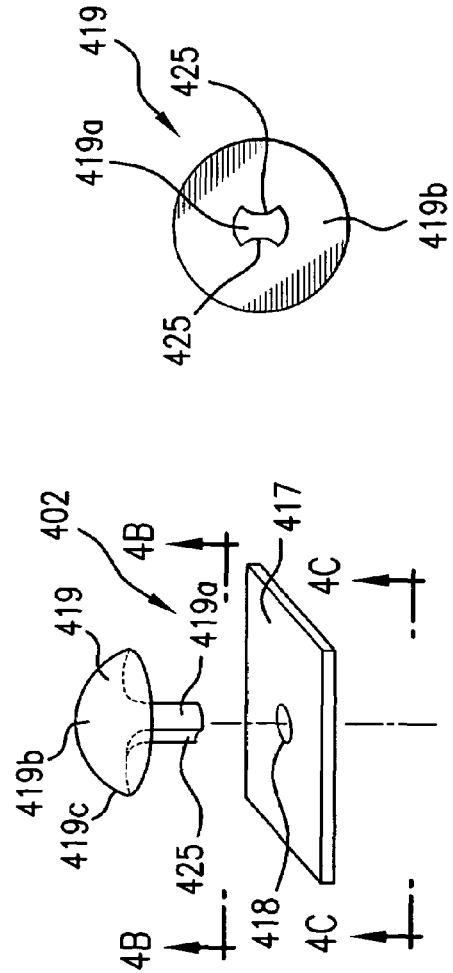
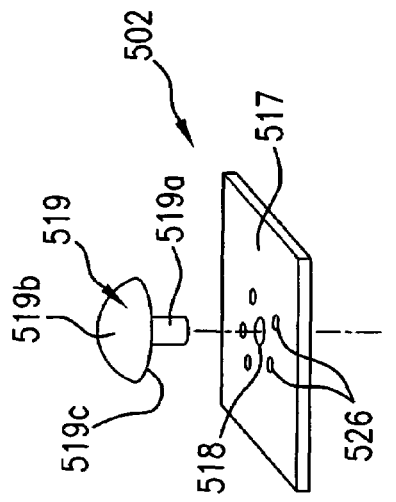
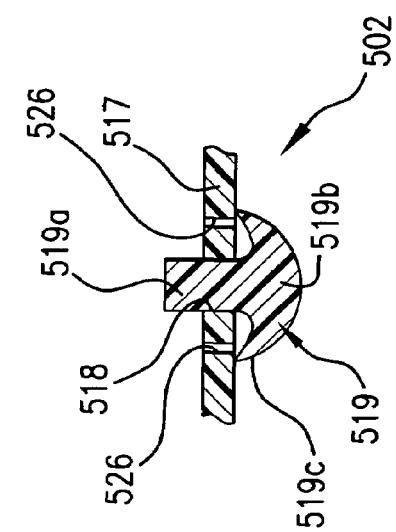

INFLATION MECHANISM AND OUTLET VALVE FOR AN ARTICLE OF FOOTWEAR INCORPORATING AN INFLATABLE BLADDER

FIELD OF THE INVENTION

An inflation mechanism and outlet valve for an article of footwear incorporating an inflatable bladder and an article of footwear containing same.

BACKGROUND OF THE INVENTION

Good fit, cushioning and shock absorption are challenges facing footwear designers. Inflatable articles have been used in the upper, under the foot, or within the sole of a shoe to enhance a shoe's fit, to provide cushioning and to help absorb shock while standing, walking or running. Inflatable products are particularly desirable for footwear because they are lightweight and can be adjustable to accommodate the particular cushioning, support or fit desired by the wearer.

Some inflatable bladders are inflated at the factory, while others have valves for which to attach inflation mechanisms, such that the individual wearer may adjust the pressure of air, or other fluid, within the inflatable bladder. An on-board inflation mechanism, i.e., an inflation mechanism incorporated directly into or onto a shoe, is particularly convenient and allows the wearer's to change the pressure within the inflatable bladder without having to carry around a removable inflation mechanism.

Such on-board inflation mechanisms may be accessible to the wearer from the exterior of the shoe, such that the wearer can manually actuate the inflation mechanism when a pressure increase in the shoe is desired. Alternatively, such an on-board inflation mechanism may be positioned beneath a wearer's foot, so that the downward pressure from the foot with each step automatically actuates the inflation mechanism.

One challenge with on-board inflation mechanisms is providing simple, easy to manufacture, and lightweight inflation chambers and valves. Another challenge is providing smaller and more elegantly designed inflation mechanisms and values which take up less space within or on shoes, providing cleaner looking lines on shoe surfaces. Often larger and more complex valves and inflation chambers are heavy and appear cumbersome on shoes.

BRIEF SUMMARY OF THE INVENTION

An embodiment of the present invention is an article of footwear including an inflatable bladder and an inflation mechanism fluidly connected to the inflatable bladder. The inflation mechanism having an inflation chamber, an inlet and an outlet. An outlet valve is positioned between the outlet of the inflation mechanism and the inflatable bladder. The outlet valve includes an umbrella valve.

Another embodiment of the present invention is an article of footwear including an inflatable bladder substantially defined by a first and second sheet of thermoplastic material and an inflation mechanism fluidly connected to the inflatable bladder. The inflation mechanism includes an inflation chamber. The inflation chamber is at least partially defined by a third sheet of thermoplastic material. An outlet valve includes a seating having a first surface defining a portion of the inflation chamber and a second surface defining a portion of the inflatable bladder. The seating includes an aperture for controlled air movement through the outlet valve and a flange extending from one of the first or second surfaces for preventing blocked air flow to the aperture.

A further embodiment of the present invention is a valve for use with an inflatable bladder of an article of footwear including a seating positioned in a pathway of airflow through the valve. The seating has an inlet surface, an outlet surface and a aperture. An umbrella valve has a stem fitted within the aperture of the seating. The umbrella valve has a flange forming a removable seal with the outlet surface of the seating. The removable seal allows for the airflow in one direction and limits the airflow in the opposite direction. A filter is positioned adjacent the inlet surface of the seating for keeping particulates from compromising the removable seal.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 4A is a schematic exploded view of an outlet valve of the present invention. FIG. 4B is a schematic bottom plan view of the umbrella valve of the outlet valve of FIG. 4A. FIG. 4C is a schematic bottom plan view of the outlet valve of FIG. 4A.

FIG. 5A is a schematic sectional view of an outlet valve of the present invention. FIG. 5B is a schematic exploded view of the outlet valve of FIG. 5A.

Figure 6:
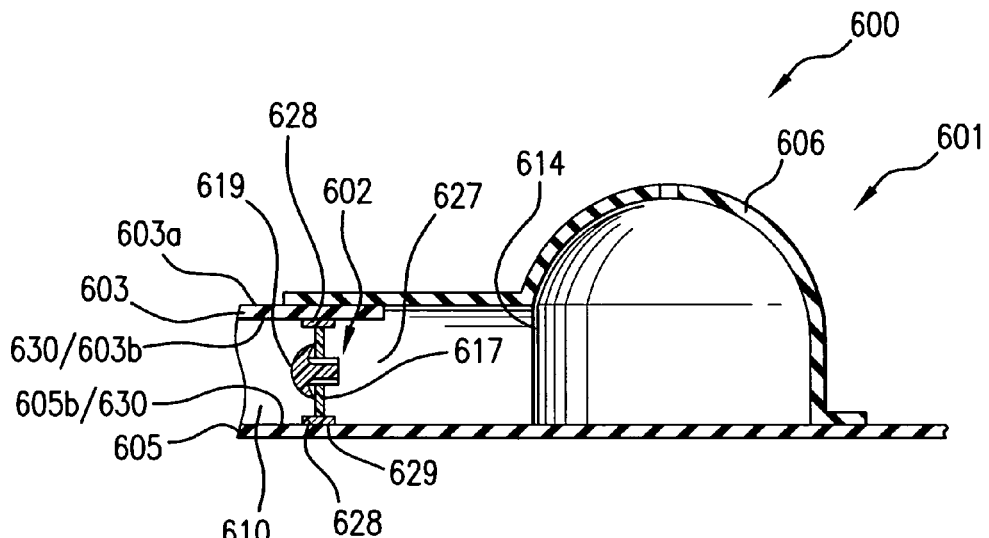

FIG. 6 is a schematic sectional view of an alternative portion of an article of footwear of the present invention.

Figure 7:
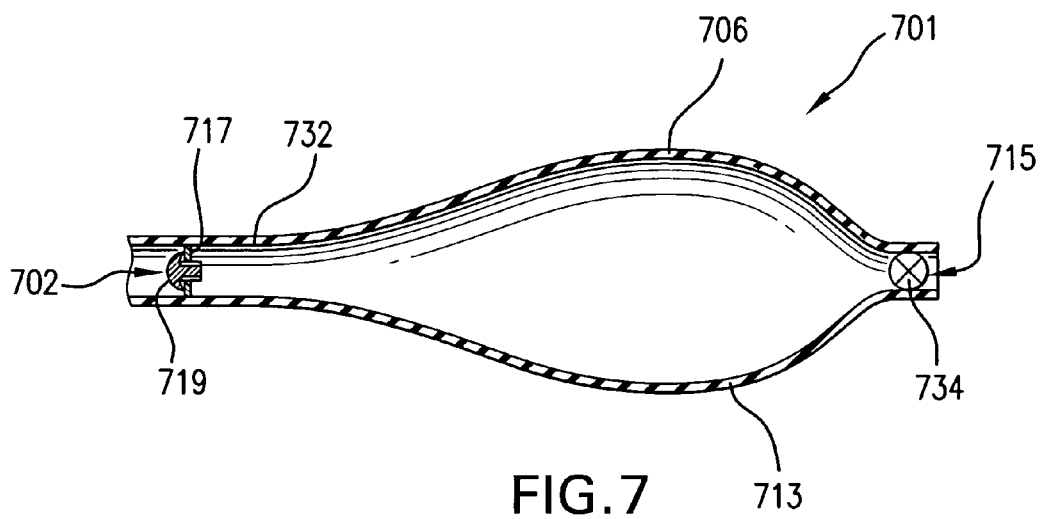

FIG. 7 is a schematic sectional view of an alternative inflation mechanism and outlet valve of the present invention.

Figure 8:
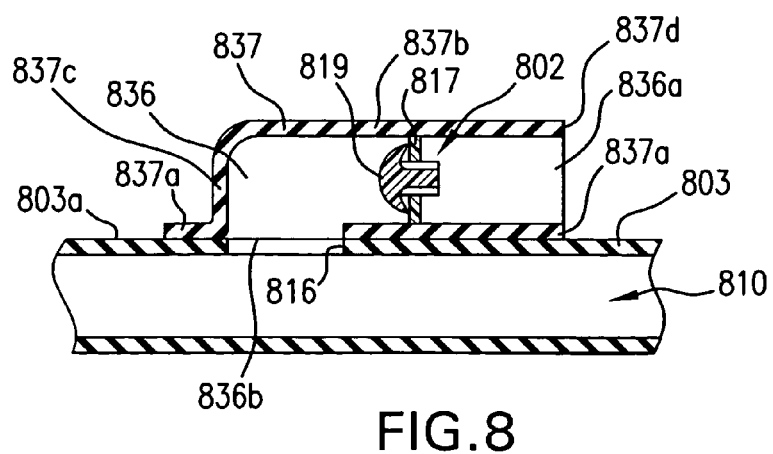

FIG. 8 is a schematic sectional view of an outlet valve and portion of an inflatable bladder of the present invention.

Figure 9A:
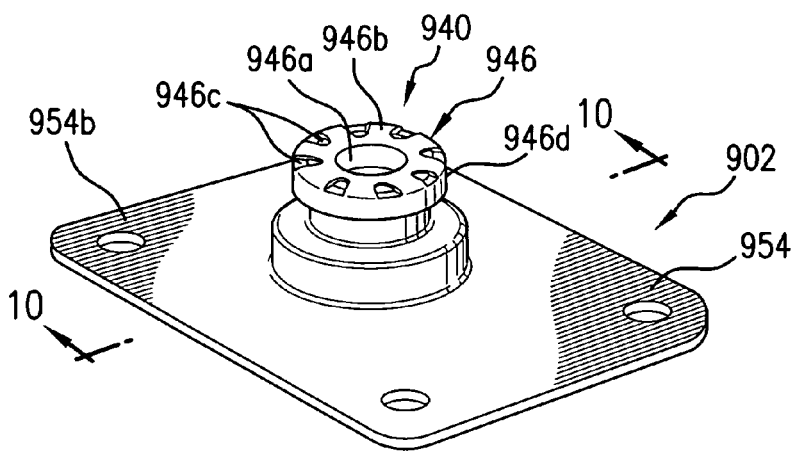
Figure 9B:
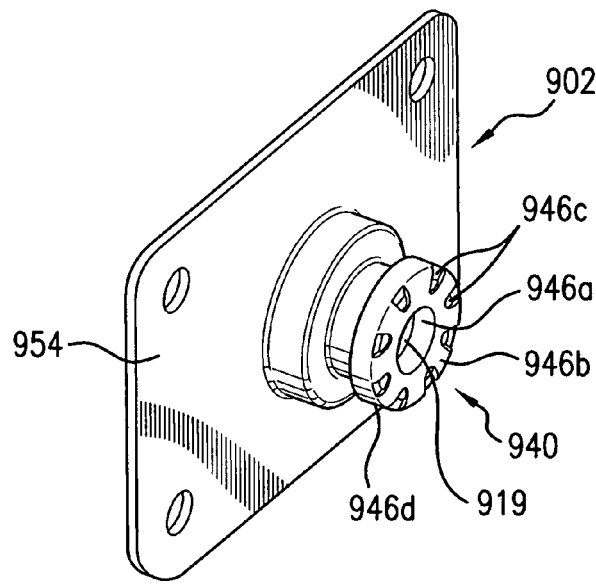
Figure 9C:
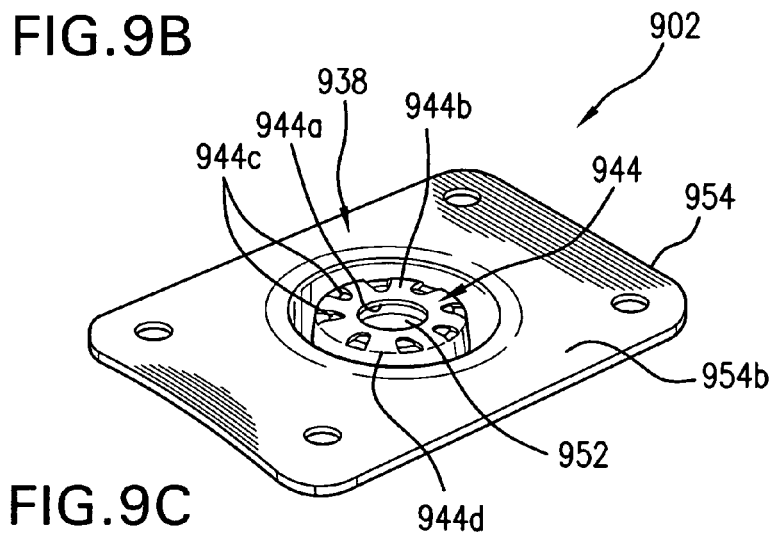
Figure 9D:
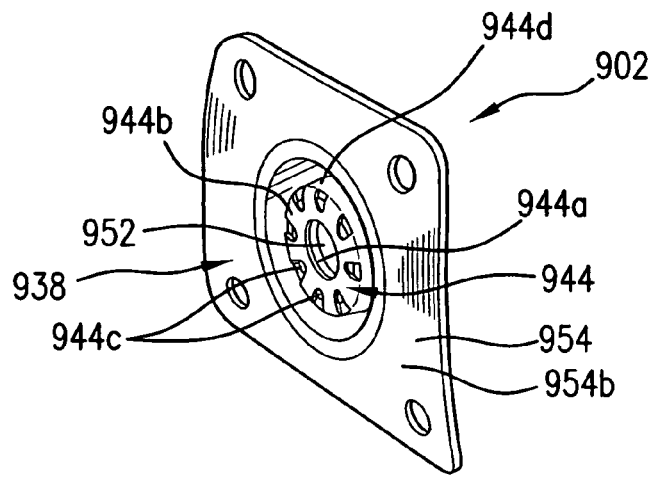

FIG. 9A is a perspective view an outlet side of an alternative outlet valve of the present invention. FIG. 9B is an alternative perspective view of the outlet side of the outlet valve of FIG. 9A. FIG. 9C is a perspective view of the inlet side of the outlet valve of FIG. 9A. FIG. 9D is an alternative perspective view of the inlet side of the outlet valve of FIG. 9A.

Figure 10:
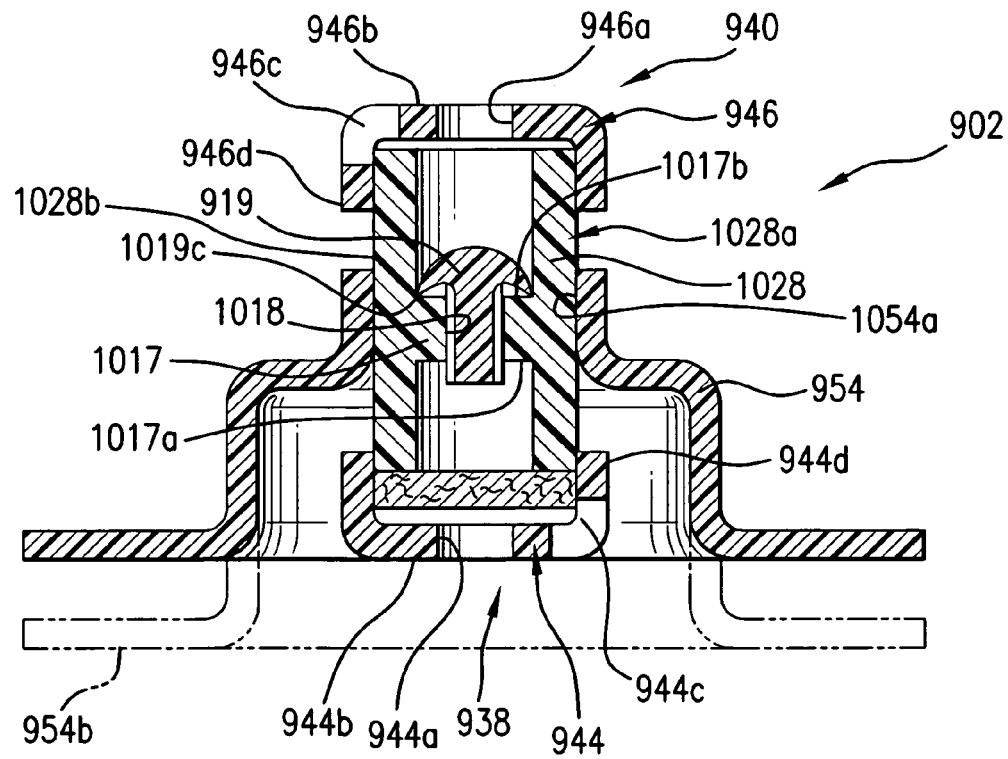

FIG. 10 is a schematic sectional view of the outlet valve of FIGS. 9A-9D taken along line 10-10 of FIG. 9A.

Figure 11:
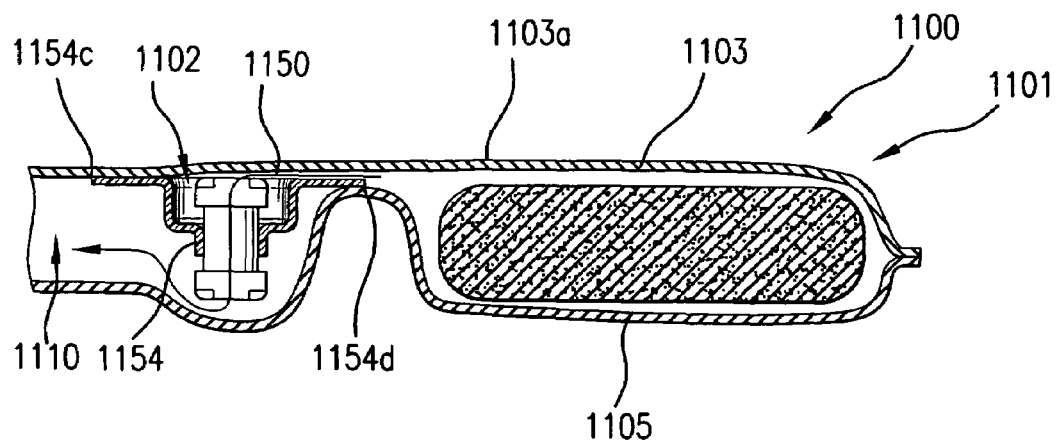

FIG. 11 is a schematic sectional view of an alternative inflation mechanism and outlet valve of the present invention.

Figure 12:
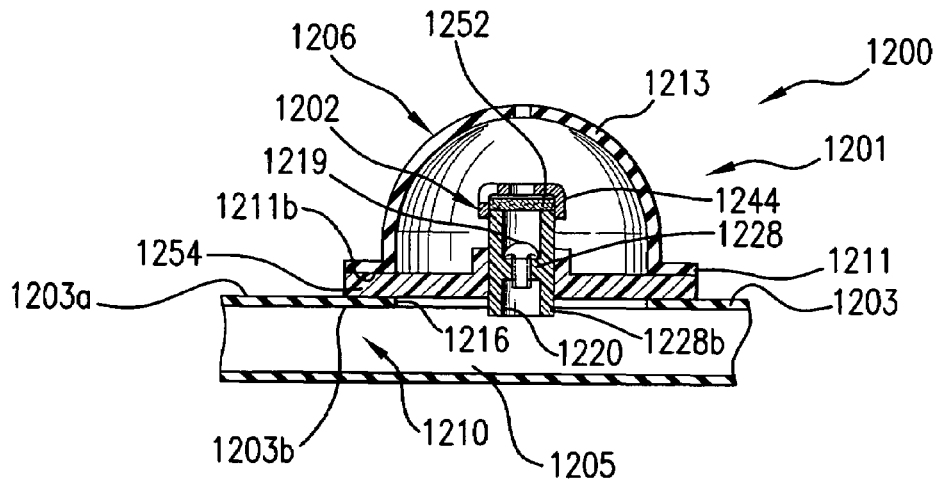

FIG. 12 is a schematic sectional view of an alternative inflation mechanism and outlet valve of the present invention.

Figure 13:
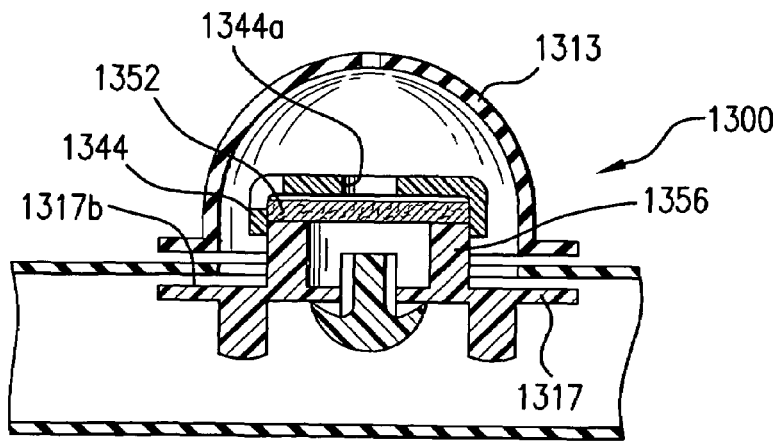

FIG. 13 is a schematic sectional view of an alternative inflation mechanism and outlet valve of the present invention.

Figure 14:
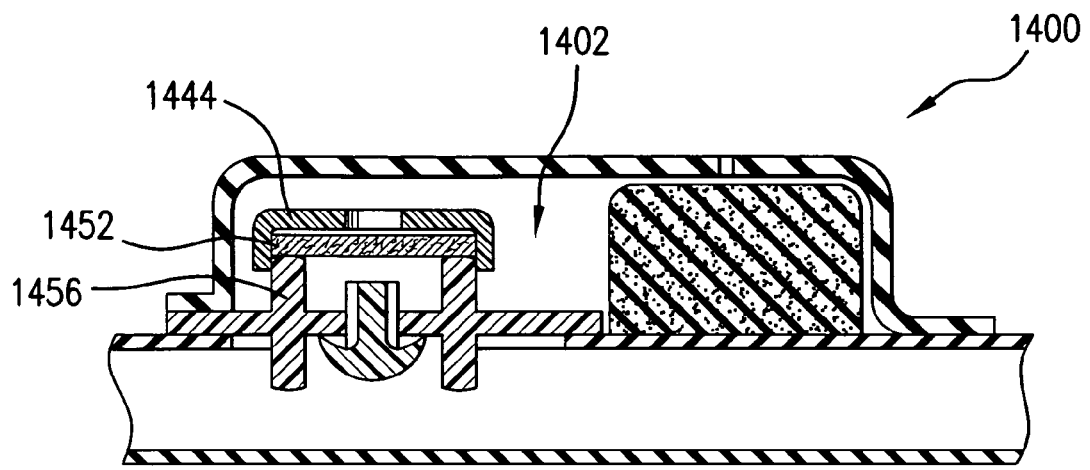

FIG. 14 is a schematic sectional view of an alternative inflation mechanism and outlet valve of the present invention.

Figure 15A:
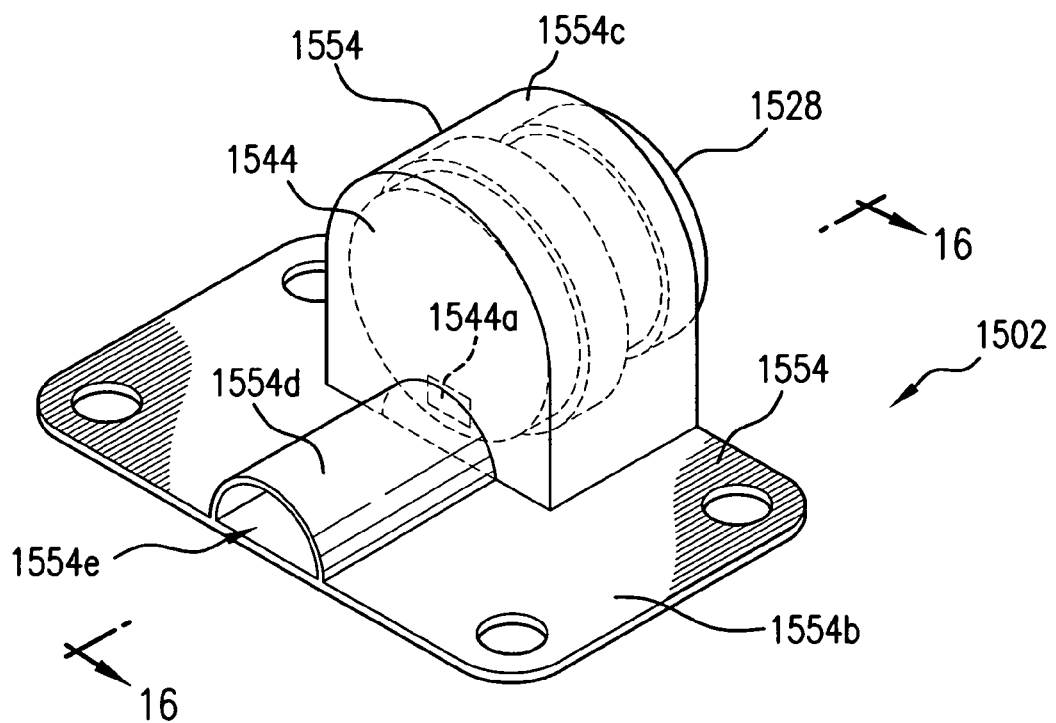
Figure 15B:
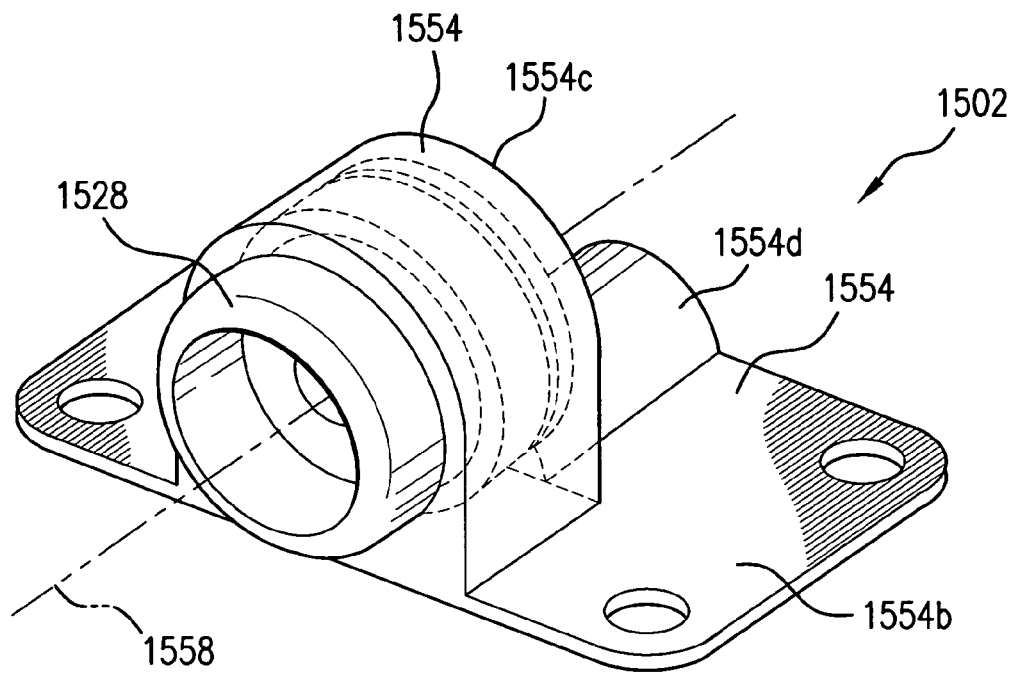

FIG. 15A is a schematic perspective view of an inlet side of an outlet valve of the present invention. FIG. 15B is a schematic perspective view of an outlet side of the outlet valve of FIG. 15A.

Figure 16:
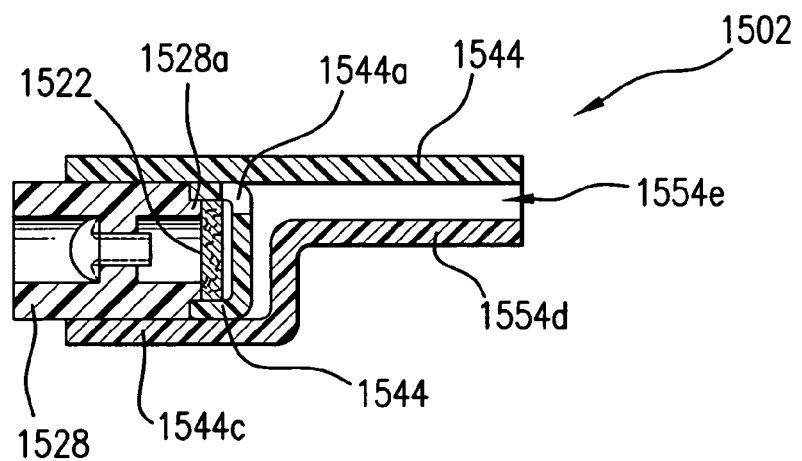

FIG. 16 is a schematic sectional view of the outlet valve of FIGS. 15A and 15B taken along line 16-16 of FIG. 13A.

DETAILED DESCRIPTION OF THE INVENTION

The present invention will be described with reference to the accompanying drawings. The drawing in which an element first appears is typically indicated by the leftmost digit(s) in the corresponding reference number.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Figure 1A:
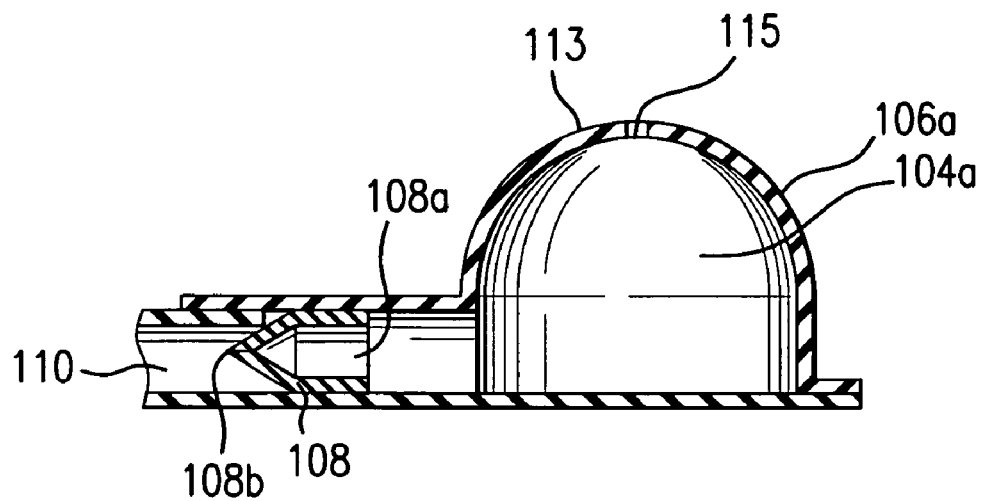
FIG. 1A is a schematic sectional view of an inflation mechanism.
Figure 1B:
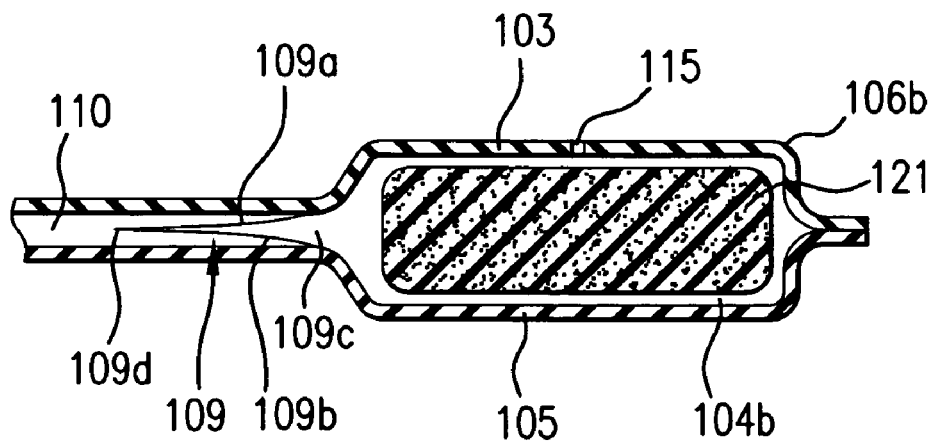
FIG. 1B is a schematic sectional view of an alternative inflation mechanism.

The present invention is directed to an inflation mechanism and outlet valve for an article of footwear incorporating an inflatable bladder and an on-board inflation mechanism. For example, one on-board inflation mechanism may include an inflation chamber having a volume, as seen in FIGS. 1A and 1B. The volume 104a of inflation chamber 106a may be defined, for example as shown in FIG. 1A, by a thermoformed bulb 113 fluidly connected to an inflatable bladder 110. Example of such a bulb 113 may be found in U.S. Pat. Nos. 5,113,599, 5,351,710 and 6,57,274, which are incorporated by reference herein each in their entirety. Another inflation chamber 106b may be formed from one or more pieces of elastomeric film 103 and 105 sealed together, as shown in FIG. 1B. The inflation chamber formed from elastomeric sheets may include, for example, a foam core 121 to provide structure and help define a volume 104b of the inflation chamber 106b. An example of such an inflation mechanism is described with respect to FIGS. 7 and 8 of U.S. Pat. Nos. 5,113,599 and 6,785,985, each of which are incorporated by reference herein in their entirety. When the inflation chamber 106a/106b is compressed, air taking up the volume 104a/104b within the inflation chamber 106a/106b is expelled from the inflation chamber 106a/106b and into the inflatable bladder 110.

Generally, inflation mechanisms of this type include an inlet one-way valve between the environment surrounding the inflation chamber and the volume within the inflation chamber. The inlet one-way valve allows air to be drawn into the volume of the inflation chamber from the environment, but limits air flow from the inflation chamber back to the environment. Upon compression of the inflation chamber, air is forced instead into the inflatable bladder. Generally, an outlet one-way valve is also positioned between the inflation chamber and the inflatable bladder, so that air forced into the inflatable bladder does not return to the inflation chamber.

Inlet one-way valve may be as simple as a hole 115 positioned at an accessible place on the inflation chamber 106a/106b, as shown in FIGS. 1A and 1B. When a wearer compresses the inflation chamber 106a/106b to actuate the inflation mechanism, the wearer covers the hole 115, for example, with a finger, thumb or bottom of the foot, or the wearer presses the hole against another surface of the shoe, so as to block the flow of air out of the inflation chamber 106a/106b. Thus, upon compression, the air is directed instead into the inflatable bladder 110. When the wearer releases the inflation chamber 106a/106b and uncovers the hole 115, air from the environment is drawn into the inflation chamber 106a/106b in preparation for the next compression. However, an open hole 115 may allow moisture, dust or other particulates into the inflation chamber 106a/106b, which ultimately may damage or render an outlet one-way valve 108/109 ineffective.

An outlet one-way valve, on the other hand, is often positioned where access by the wearer would be undesirable, such as within a sole or upper of a shoe. Thus, the outlet valve must be actuated automatically. One example outlet one-way valve is a duck bill valve 108, as shown in FIG. 1A. Duck bill valves have an open inlet end 108a and an outlet end 108b which is biased closed, such that air is moved through the biased outlet end 108b in only one direction. An example of an inflatable bladder using a duck bill valve can be found in U.S. Pat. No. 6,510,624 to Lakic. Duck bill valves generally have a large volume and take up a lot of space. Also, duck bill valves do not wear well. Over time, the seal formed by the biased outlet end 108b may become weakened fostering air leaking back through the outlet end 108b.

Another type of outlet one-way valve is a thin film valve or "flapper valve" 109, as shown in FIG. 1B. Thin film valves include two pieces of thin plastic film 109a and 109b which are sealed along two sides. The thin films are biased open at an inlet end 109c. At an outlet end 109d, the films have a sticking property that draws the two film pieces together. The sticking property may be as simple as static forces between two opposing shiny surfaces of the thin films. Air moving with sufficient force from the inlet end 109c to the outlet end 109d will draw the films apart allowing air to flow through the outlet end. When the force is removed, the films stick together again at the outlet end 109d to prevent air flow between the sheets in the opposite direction. An example of a flapper valve may be found in U.S. Pat. No. 5,144,708, which is incorporated by reference herein in its entirety.

In another type of one-way valve (not shown), a ball or disc is pushed against a fitting and closes the valve when pressure is applied in one direction and is automatically forced away from the fitting to open the valve when air is forced against the ball from the other direction. An example of such a valve is described in U.S. Pat. No. 5,113,599, which is incorporated by reference herein in its entirety.

The thin film valve 109 has a much smaller profile than the duck bill valve. However, consisting of only two thin pieces of film, it lacks structural integrity and can become easily damaged.

Also, as shown in FIGS. 1A and 1B, inflation mechanisms are generally designed to be positioned on a shoe adjacent to the inflatable bladder or attached to the inflatable bladder via tubing or other channels. This placement may take up additional space within, or on an exterior surface of, the shoe, may add additional weight to the shoe and may provide a cumbersome appearance.

Figure 2:
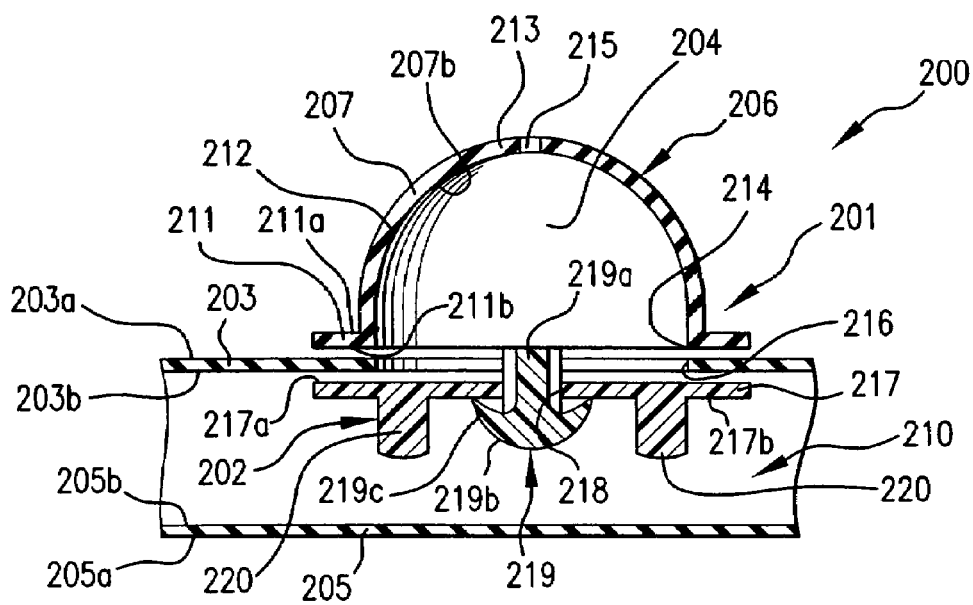
FIG. 2 is a schematic exploded sectional view of a portion of an article of footwear of the present invention.

FIG. 2 illustrates a portion 200 of an article of footwear including an inflation mechanism 201, fluidly connected with an inflatable bladder 210 via an outlet valve 202 of the present invention. As would be apparent to one of skill in the art, the article of footwear may include an upper and a sole, wherein inflatable bladder 210 forms all or part of the upper and/or sole. Inflatable bladder 210, only a portion of which is disclosed in the figures, is substantially formed from a first sheet of flexible thermoplastic material 203 and a second sheet of flexible thermoplastic material 205. First sheet 203 and second sheet 205 may be thermoplastic films that have been sealed together to form a fluid-tight or slowly fluid-diffusing chamber. For example, U.S. Pat. No. 6,785,985 and U.S. patent application Ser. No. 10/887,927, which are incorporated by reference herein each in their entirety, disclose bladders formed from sheets of a light urethane film, a polyester film such as MYLAR®, an ethyl vinyl acetate film or another barrier film. For example, bladders for footwear have been made from a matted polyurethane film commercially available from J.P. Stevens & Co (Easthampton, Mass.) under the product number ST-1880 M2. Two sheets of elastomeric and/or thermoplastic film are sealed along various weld lines, for example by radio frequency (RF) welding, to form an air-tight inflatable bladder 210.

Thermoplastic films can be formed from a variety of thermoplastic resins or other elastomeric materials, including, but not limited to, polyurethanes (TPU), ethylenevinylacetate/polyethylene copolymer; polyester elastomer (Hytrel); ethylenevinylacetate/polypropylene copolymer; polyethylene; polypropylene; neoprene; natural rubber; dacron/polyester; polyvinylchloride; thermoplastic rubbers; nitrile rubber; butyl rubber; sulfide rubber; polyvinyl acetate; methyl rubber; buna N.; buna S.; polystyrene; ethylene propylene; polybutadiene; polypropylene; silicone rubber, chlorsulfonated polyethylene, nylon and other thermoplastic or elastomeric materials. One particular example is a polyester urethane film having a 85A shore hardness and a melting temperature of 150° C., available from Hyo-Sung Corp. (Korea). One skilled in the art can appreciate that any number of thermoplastic or elastomeric materials are suitable for use in the present invention, provided such material is fluid-impervious and capable of forming an air-tight seal with a similar or different thermoplastic or elastomeric materials.

As discussed above, sheets 203 and 205 are sealed together along a peripheral weld line (not shown). Several methods have been developed to form an air tight seal between sheets of thermoplastic films. Some non-limiting examples of sealing techniques include ultrasonic welding, radio frequency (RF) welding, thermal welding and airtight adhesive bonding. One skilled in the art can appreciate that the particular choice of sealing techniques is dependent upon the type of material used for first sheet 203 and second sheet 205.

The thermoplastic films may be used alone to form bladder 210 or thermoplastic films may be formed as a laminate of the thermoplastic film and a substrate. In this embodiment, the substrate generally forms the exterior surface 203a of first sheet 203, the exterior surface 205a of second sheet 205 or both, such that the interior surfaces 203b and 205b, which face each other, are thermoplastic films. However, one skilled in the art can appreciate that material may also be laminated to interior surfaces 203b and 205b, if desired.

Substrates may be any of a variety of textiles, for example any synthetic or natural fibers or fabrics. One non-limiting example of a fabric used as a laminate in bladders for athletic shoes is a non-woven high density 70% nylon and 30% polyester blend, available from Dae Woo International Corp. (Pusan, Korea).

Inflation mechanism 201 includes an inflation chamber 206, defining a volume 204. The inflation chamber 206 is formed from a third sheet 207 of flexible thermoplastic material. Third sheet 207 may be any of the thermoplastic materials suggested above for first sheet 203 and second sheet 205. However, the thickness and hardness of third sheet 207 may be greater than first sheet 203 and second sheet 205 (approximately 0.5 mm thick and a Shore A durometer hardness of 85) to render inflation chamber 206 self-supporting and to provide the inflation chamber 206 with increased resiliency and shape retention qualities. Inflation chamber 206 may be molded, for example by injection molding or other known molding techniques, or otherwise pre-formed to include a flange 211 circumferentially surrounding an outlet 214, a substantially cylindrical side wall 212, and a convex or dome-like bulb 213. Further, in an alternative embodiment, inflation chamber may be include a foam insert (not shown) to provided additional support to the inflation mechanism.

Additionally, inflation chamber 206 is formed with an inlet 215. In alternative embodiments, inlet 215 may be coupled with an inlet valve (not shown), allowing air to flow from the environment into inflation chamber 206 but limiting the flow from inflation chamber 206 to the environment.

As shown in FIG. 2, an interior surface 211b of flange 211 of inflation chamber 206 may be sealed to exterior surface 203a of first sheet 203 of bladder 210. Any of the above described methods for sealing may be used, for example, and sealing techniques may vary depending upon the materials used for forming inflation chamber 206 and bladder 210. Flange 211 is sealed to an area of first sheet 203 around a perimeter of an opening 216 in first sheet 203, so that opening 216 of first sheet 203 is adjacent and fluidly connected with outlet 214 of inflation chamber 206.

Outlet valve 202 includes a seating 217. Seating 217 includes a first surface 217a and a second surface 217b. In the embodiment of FIG. 2, a perimeter of first surface 217a of seating 217 is sealed to interior surface 203b of first sheet 203 around a perimeter of opening 216.

In alternative embodiments, an exterior surface 211a of flange 211 may be sealed to interior surface 203b of first sheet 203. In these embodiments, sidewall 212 and bulb 213 of inflation chamber 206 are received by and extend through opening 216 in a direction away from second sheet 205. Also, first surface 217a of seating 217 is sealed to interior surface 211b of flange 211.

In other embodiments, second surface 217b of seating 217 is sealed to exterior surface 203a of first sheet 203 and interior surface 211b of flange 211 is sealed to first surface 217a of seating 217. In this embodiment, a portion of outlet valve 202 is received by and extends through opening 216 in a direction towards second sheet 205.

Nonetheless, in each of these embodiments, a portion of second surface 217b of seating 217, interior surface 203b of first sheet 203 and interior surface 205a of second sheet 205 form interior surfaces of bladder 210. Further, in the embodiment of FIG. 2, a portion of first surface 217a of seating 217 and an interior surface 207b of third sheet 207 form interior surfaces of inflation mechanism 201.

Seating 217 also includes an stem aperture 218 defining an air path through outlet valve 202. Preferably, stem aperture 218 is removably sealed by an umbrella valve 219. Umbrella valves suitable for use in the present invention are commercially available from Vernay Laboratories, Inc. (Yellow Springs, Ohio). Umbrella valve 219 is particularly preferred because of its integrity and durability. Umbrella valve 219 includes a stem 219a, which is received by and extends through stem aperture 218, and a hood 219b. Hood 219b includes a flange 219c, which rests against second surface 217b of seating 217 forming a removable air tight seal therewith.

When inflation chamber 206 is depressed, inlet 215 is covered such that air is not allowed to escape from inflation chamber 216 via inlet 215. As volume 204 decreases, pressure within inflation chamber 206 increases. Once the pressure within inflation chamber 206 reaches a predetermined pressure, flange 219c of umbrella valve 219 is forced away from second surface 217b of seating 217 breaking the air-tight seal therewith, and air is allowed to flow along stem 219a and into bladder 210 via stem aperture 218. When the inflation chamber 206 is no longer depressed, air is allowed to enter inflation chamber 206 through hole 215. As volume 204 increases with the in-flow of air, a negative pressure is created in inflation chamber 206 reinstating the seal between flange 219c of umbrella valve 219 and second surface 217b of seating 217.

In FIG. 2, second surface 217b of seating 217 also includes one or more flanges 220 extending therefrom in a direction towards second sheet 205. Flanges 220 preferably extend from second surface 217b of seating 217 farther than hood 219b of umbrella valve 219. Flanges 220 hold second sheet 205 positioned away from the seal formed from flange 219c of umbrella valve 219 and seating 217 to avoid having second sheet 205 collapse against seating 217 and block the flow of air from inflation mechanism 201.

Figure 3A:
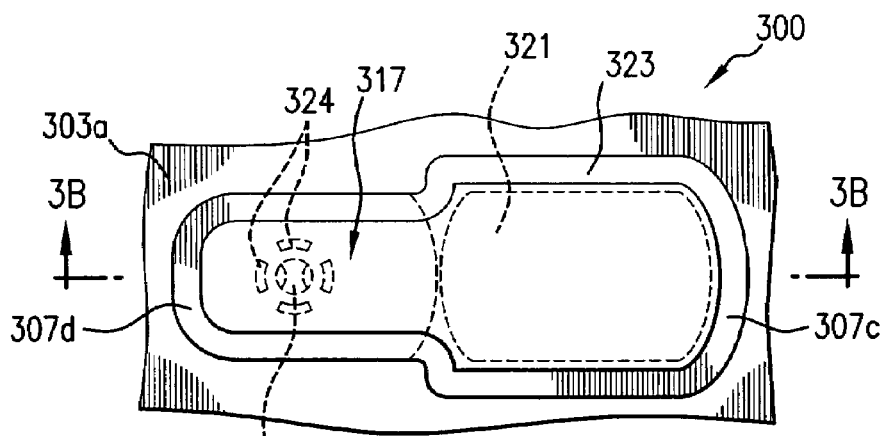
FIG. 3A is a schematic top plan view of an alternative portion of an article of footwear of the present invention.
Figure 3B:
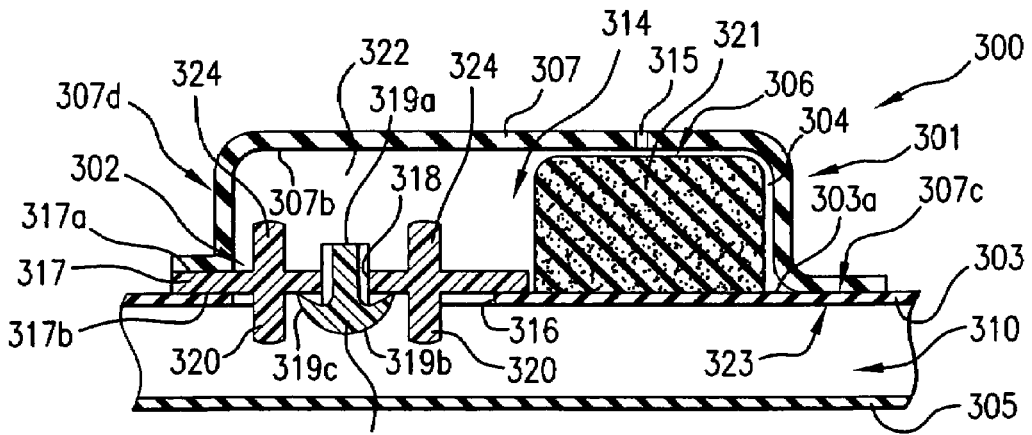
FIG. 3B is a schematic sectional view of the portion of FIG. 3A taken along line 3B-3B.

FIGS. 3A and 3B illustrate an alternative portion of an article of footwear 300, including a bladder 310, inflation mechanism 301 and an outlet valve 302. In this embodiment, third sheet 307 is formed of a flexible material similar to that used for first sheet 303 and second sheet 305, which are similar to first and second sheets 203 and 205 described above. Thus, an inflation chamber 306 of inflation mechanism 301 may include a foam core 321 to aid in defining a volume 304 of inflation chamber 306. An inlet 315 formed in third sheet 307 functions similarly to inlet 215 described above. Inflation mechanism 301 is particularly suited to be operated by the downward pressure of a wearer's foot. Either the wearer's foot or the pressure created by the foot on another part of the article of footwear may be use to block inlet 215 upon actuation of inflation mechanism 301. Inflation mechanism 301 may also be positioned on the exterior of a shoe so as to be manually operated by the wearer.

In the embodiment of FIGS. 3A and 3B, third sheet 307 has a first end 307c, where an interior surface 307b is sealed directed to an exterior surface 303a of first sheet 303 around a perimeter seal 323. At a second end 307d, perimeter seal 323 seals interior surface 307b of third sheet 307 directly to a first surface 317a of a seating 317 of outlet valve 302 around a portion of a perimeter of seating 317, as shown in FIG. 3A.

Seating 317 also has a second surface 317b which is sealed directly to exterior surface 303a of first sheet 303, such that a portion of seating 317 is received by and extends through an opening 316 in first sheet 303 towards second sheet 305. As discussed above, there are several possible arrangements for sealing first sheet 307, seating 317 and third sheet 307 to form an air-tight perimeter seal around opening 316 in first sheet 307.

In the embodiment of FIGS. 3A and 3B, outlet valve 302 and inflation chamber 306 are positioned side by side, rather than adjacent as shown in FIG. 2. Thus, a portion of third sheet 307 forms a channel 322 from an outlet 314 of inflation chamber 306 to outlet valve 302.

Seating 317 is similar to seating 217 described above in that it has a stem aperture 318, into which a stem 319a of an umbrella valve 319 is positioned, a seal formed by a flange 319c of a hood 319b of umbrella valve 319 and second surface 317b of seating 317 and flanges 320 extending from second surface 317b towards second sheet 305. However, since inflation chamber 306 does not have the resiliency of bulb 213 of inflation chamber 206, shown in FIG. 2, seating 317 also includes second flanges 324 extending from first surface 317a of seating 317 towards third sheet 307. Flanges 324 avoid having third sheet 307 collapse against seating 317 and block air flow to outlet valve 302.

FIGS. 4A-4C and 5A-5B illustrate two different arrangements for the cooperation between a seating and an umbrella valve of an outlet valve of the present invention. FIGS. 4A-4C illustrate an outlet valve 402 similar to that, shown in FIGS. 2, 3A and 3B. In this embodiment, a umbrella valve 419 has a stem 419a which is received by a stem aperture 418 in seating 417. In this case, stem 419a includes one or more stem channels 425 therein to allow the air to flow through seating 417 and up under hood 419b of umbrella valve 419.

In outlet valve 502, shown in FIGS. 5A and 5B, stem 519a of umbrella valve 519 is also received by a stem aperture 518 in a seating 517. However, instead of having a channel in the stem 519a of umbrella valve 519, one or more intake channels 526 are formed in seating 517 to allow air to flow through seating 517 and up under hood 519b. Intake channels 526 are covered by hood 519b and flange 519c of umbrella valve 519 in order to form a removable seal therewith.

In the outlet valves 402 and 502 of FIGS. 4A-4C and 5A-5B, respectively, when the air pressure under the hood 419b/519b of the umbrella valve 419/519 reaches a predetermined pressure, the flange 419c/519c of the umbrella valve 419/519 is lifted off of the seating 417/517, breaking the seal therebetween to allow air to flow through the outlet valve 402/502. Thus, either outlet valve 402 or 502 would be suitable for any of the embodiments described or otherwise disclosed herein.

FIG. 6 illustrates another embodiment of a portion of an article of footwear 600 including an inflation mechanism 601, an outlet valve 602 and an inflatable bladder 610. As discussed above, inflatable bladder 610 may be located in or near the sole and/or upper of the article of footwear. Inflation mechanism 601 has an inflation chamber 606, similar to inflation chamber 206 of FIG. 2. In this embodiment, outlet valve 602 includes a seating 617 and an umbrella valve 619. However, seating 617 and umbrella valve 619 are positioned in-line with a fluid channel 627 between an outlet 614 of inflation chamber 606 and inflatable bladder 610. Seating 617 is disposed perpendicular to the flow of air through channel 627. Seating 617 may be positioned within channel 627 in a number of ways. For example, seating 617 may be affixed to a barrel assembly 628 having an exterior surface 629 shaped to conform to an inner surface 630 of channel 627. For example, barrel assembly 628 may be cylindrically-shaped, and may be welded to inner surface 630 of channel 627, which in FIG. 6 is defined by both an interior surface 603b of first sheet 603 and an interior surface 605a of second sheet 605.

In other embodiments, a seating 317 may be positioned in-line with an outlet channel 732 that is not defined by first and second sheets of an inflatable bladder. For example, FIG. 7 illustrates an inflation mechanism 701 and an outlet valve 702. Outlet valve 702 includes a seating 717 and an umbrella valve 719. Outlet valve 702 is positioned within an outlet channel 732 formed by molded rubber, such as butyl rubber or a latex rubber, which has been molded to also define a rubber bulb 713 used as an inflation chamber 706 of inflation mechanism 701. Outlet channel 732 may be connected by any number of air-tight fittings to a variety of inflatable bladders (not shown). Inflation chamber 706 may included an inlet 715 including an inlet valve 734 to limit the flow of air from inflation chamber 706 to the surrounding environment. Seating 717 may be affixed directly to channel 732, as shown in FIG. 7, or it may be affixed to a barrel assembly, similar to barrel assembly 628 of FIG. 6.

In the embodiment shown in FIG. 8, an outlet valve 802 having a seating 817 and an umbrella valve 819 is positioned within a channel 836, having an inlet 836a and an outlet 836b. Outlet 836b is adjacent and in fluid communication with an opening 816 in a first sheet 803 of an inflatable bladder 810. In this embodiment inlet 836a may be fluidly connected to any type of inflation chamber of an inflation mechanism (not shown), for example, by a male barb fit or interference fit tubing positioned within female inlet 836a. Channel 836 may be formed from a molded thermoplastic casing 837. Casing 837 has a flat portion 837a that is directly adhered to first sheet 803 of bladder 810. Casing 837 also has a domed portions 837b. Domed portion 837b is generally a half-cylinder shape with a closed first end 837c and a second end 837d comprising inlet 836a, into which an inflation mechanism is connected.

In the embodiment of FIGS. 9A-9D and FIG. 10, an outlet valve 902 includes generally an inlet side 938 and an outlet side 940. Outlet valve 902 includes a barrel assembly 1028. Barrel assembly 1028 includes a seating 1017 having a stem aperture 1018 into which an umbrella valve 919 has been fitted. Seating 1017 includes a first surface 1017a and a second surface 1017b, with a flange 1019c of umbrella valve 919 resting against second surface 1017b forming a removable air-tight seal therewith. Umbrella valve 919 and seating 1017 function as described above with respect to FIGS. 4A-4C and 5A-5B.

Barrel assembly 1028 includes an inlet cap 944 and an outlet cap 946, which are used to hold an attached inflation mechanism and/or inflatable bladder (not shown) positioned away from the seal formed by flange 1019c of umbrella valve 919 and second surface 1017b of seating 1017, so as to not block the flow of air through outlet valve 902. Inlet cap 944 and outlet cap 946 are pressure fit over barrel assembly 1028. Inlet cap 944 includes an central inlet hole 944a generally located in the center of a top surface 944b of inlet cap 944 and a plurality of spaced holes 944c around central inlet hole 944a. Spaced holes 944b are cut both into top surface 944b of inlet cap 944 and into a side surface 944d of inlet cap 944. Thus, if, for example, central inlet hole 944a is blocked by a sheet of an inflatable bladder (not shown) then air can still pass through outlet cap 944 through the portion of spaced holes 944b in side surface 944d. Outlet cap 946 is designed similarly to inlet cap 944 in that it includes a central outlet hole 946a formed generally in a central area of a top surface 946b of outlet cap 946 and a plurality of spaced holes 946c formed both in top surface 946b and a side surface 946d of outlet cap 946.

Located within inlet cap 944 is a filter 952. Filter 952 blocks any particulates, such as moisture, dirt or other particulates that may enter the inflation mechanism, for example via a hole that operates as an inlet valve to the inflation mechanism when covered by the user, as described above. Without filter 952, such moisture, dust or dirt may become lodged under the removable seal formed between second surface 1017b of seating 1017 and flange 1019c of umbrella valve 919 compromising the removable seal and allowing air to leak back into inflation mechanism. Filter 952 is preferably a non-woven filter, particularly a non-woven polyester (for example product number ST 1304N commercially available from Freudenburg Co.). A non-woven filter 952 will not shed its own fibers as air is directed therethrough, which also may compromise valve 902.

While inlet cap 944 is provided to contain filter 952, outlet cap 946 is optional and not necessary to the functioning of valve 902, this is particularly true if the outlet end 1028a of barrel assembly 1028 is a flange with spaced apart indentions, such as flange 324 as shown in FIG. 3A.

Barrel assembly 1028, inlet cap 944 and outlet cap 946 may be molded, extruded or otherwise formed from a variety of materials. Preferably, they are each formed from a thermoplastic material, such as DELRIN (available from DuPont) or a polycarbonate plastic material. Any thermoplastic material used to form barrel assembly 1028 may or may not be compatible with the materials used to form an inflation mechanism and or an inflatable bladder. If compatible, the components of the inflation mechanism and/or inflatable bladder may be bonded directly to the barrel assembly 1028, for example using any of the techniques discussed above. However, if barrel assembly 1028 is an incompatible material, a thermoplastic urethane (TPU) overlay 954 may be molded around or welded to the barrel assembly 1028 so that the valve 902 may be bonded to an inflation mechanism and/or inflatable bladder to form an air-tight fluid path through valve 902.

TPU overlay 954 as illustrated in FIGS. 9A-9D and 10 is bonded at a central opening 1054a to an exterior surface 1028b of barrel assembly 1028 at a mid-section thereof. TPU overlay 954 is molded to curve around and over inlet cap 944 and provides a flat surface 954b in the same plane as or extending farther (shown in FIG. 10 in phantom) than top surface 944b of inlet cap 944. With TPU overlay 954 having flat surface 954b, a user's foot can be positioned adjacent the flat surface 954b without any discomfort.

For example, FIG. 11 illustrates a portion of an article of footwear 1100 having an outlet valve 1102 positioned between an inflation mechanism 1101 and an inflatable bladder 1110. Inflation mechanism 1101 and bladder 1010 are similar to that described above in FIGS. 3A and 3B, however, the first sheet 1103 and the second sheet 1105 used to form inflation mechanism 1101 are the same sheets used to form inflatable bladder 1110. In other words, inflation mechanism 1101 and inflatable bladder 1110 are monolithic. However, outlet valve 1102 may be used with any of the inflation mechanisms disclosed or otherwise described herein. Outlet valve 1102 is the same as outlet valve 902 described above. However, in order to have air move from inflation mechanism 1101 into inflatable bladder 1110 through outlet valve 1102, as illustrated by arrow 1150, a first portion 1154c of TPU overlay 1154 is bonded to first sheet 1103 and a second portion 1154d of TPU overlay 1154 is bonded to second sheet 1105. A user's foot positioned adjacent exterior surface 1103a would be against a substantially flat surface. As such, inflatable mechanism 1101 and outlet valve 1102 may be placed within a shoe sole such that exterior surface 1103a is flush with a top surface of a shoe sole (not shown) over or under a conventional sockliner (not shown) which may be provided along with a shoe sole.

As with all of the embodiments disclosed herein, inflatable bladder 1110 may form a portion of the upper and or sole of the article of footwear. In a preferred embodiments, for example, inflatable bladder 1110 forms a portion of the upper of an article of footwear and inflation mechanism 1101 is disposed under the foot—such that downward pressure of a wearer's foot actuates inflation mechanism 1101 to constrict inflatable bladder 1101 around a wearer's foot. Alternatively, for example, inflatable bladder 1110 may form a portion of the sole of an article of footwear and inflation mechanism is disposed under the foot—such that downward pressure of a wearer's foot actuates inflation mechanism 1101 to pressurize inflatable bladder 1101 which provides underfoot cushioning and/or shock absorption to the wearer's foot.

In another alternative embodiment, any of the inflation mechanisms disclosed herein, for example inflation mechanism 1101, may be disposed elsewhere—such as adjacent the upper when inflatable bladder 1110 is form in or as an upper. With each step a wearer takes the wearer's foot will contact the upper in several places. For example, the top of the forefoot contacts the vamp portion of the upper. As such, in one embodiment, inflation mechanism 1101, for example, may be positioned between the vamp portion of an upper and the wearer's foot. Thus, when a wearer lifts his foot, an inflation chamber of inflation mechanism 1101 would compress, forcing air into inflatable bladder 1110 through outlet valve 1102.

FIG. 12 illustrates a portion of an article of footwear 1200, similar to portion of article of footwear 200 of FIG. 2, except that outlet valve 1202 includes a barrel assembly 1228, which is similar to barrel assembly 1028 of FIG. 10, and a TPU overlay 1254 sealed between an interior surface 1211b of a flange 1211 of an inflation chamber 1206 of inflation mechanism 1201 and a perimeter of an exterior surface 1203a of a first sheet 1203 about an opening 1216 forming an inflatable bladder 1210. Any of the alternative arrangements discussed above with respect to FIG. 2 are also suitable for sealing flange 1211 and TPU overlay 1254 with respect to opening 1216 in first sheet 1203. In FIG. 12, TPU overlay 1254 does not need to be curved around inlet cap 1244 since bulb 1213 of inflation chamber 1206 may be sufficiently sturdy that it does not lie flat against barrel assembly 1228. Inlet cap 1244 contains a filter 1252 adjacent and covering umbrella valve 1219. As discussed above, outlet valve 1202 does not include an optional outlet cap since outlet end of barrel assembly 1228 includes flanges 1220 that keep a second sheet 1205 of inflatable bladder 1210 from blocking air movement from umbrella valve 1219.

In other embodiments, a filter and inlet cap can be fitted directly with a seating, as previously described, without requiring a barrel assembly. For example, a portion of an article of footwear 1300 illustrated in FIG. 13 is similar to portion 200 in FIG. 2, except that a second surface 1317b of a seating 1317 has a barrel 1356 extending therefrom towards inflation chamber 1306. An inlet cap 1344 is pressure fit against barrel 1356 and contains a filter 1452. Similarly, a portion of an article of footwear 1400 illustrated in FIG. 14 is similar to portion 300 of FIG. 3. However, instead of having flanges 324, outlet valve 1402 includes a barrel 1456. An inlet cap 1444 is pressure fit against barrel 1456 and contains a filter 1452. Inlet caps 1344 and 1444 may be similar to those described above with respect to FIG. 10. However, inlet cap 1344 may have only a central inlet hole 1344a since dome 1313 is likely sturdy enough to prevent third sheet 1307 from collapsing against inlet cap 1344 and blocking air flow therethrough.

FIGS. 15A-15B and 16 illustrate another embodiment of an outlet valve 1502. Outlet valve 1502 includes a barrel assembly 1528, similar to barrel assembly 1028 described above with respect to FIG. 10. An inlet cap 1544 containing a filter 1552 is pressure fit with barrel assembly 1528. However, outlet valve 1502 is an in-line valve, in that barrel assembly 1528 is in-line with the direction of air flow, in contrast to outlet valve 1102 of FIG. 11. As such, an axis 1558 of barrel assembly 1528 is generally parallel with, rather than generally perpendicular to, a flat surface 1554b of a TPU overlay 1554. Also, TPU overlay 1554 is molded with a first casing 1554c for encasing at least and inlet end 1528a of barrel assembly 1528. TPU overly 1554 is also molded with a second casing 1554d forming an air channel 1554e fluidly connected with at least one hole 1544a in inlet cap 1544. An in-line outlet valve 1502 includes the same benefits discussed above with respect to outlet valves 602, 702 and 802 of FIGS. 6-8.

Although the above embodiments are directed to an inflation mechanism outlet valve, an umbrella valve and a corresponding filter according to the present invention may be used in other locations in an article of footwear having an inflatable bladder. For example, an umbrella valve with a filter as described may be used an as inlet valve between the environment and an inflation mechanism or as an outlet valve, or bleed off valve, between an inflatable bladder and the environment to avoid over-inflation of an inflatable bladder, particularly with an underfoot, or self-inflating, inflation mechanism.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An article of footwear, comprising:
   an inflatable bladder;
   an inflation mechanism fluidly connected to said inflatable bladder, said inflation mechanism having an inflation chamber and an outlet; and
   an outlet valve positioned between said outlet of said inflation mechanism and said inflatable bladder, wherein said outlet valve includes an umbrella valve having a seating and a stem, said seating having a first surface defining a portion of said inflation chamber, said first surface having an aperture for receiving said stem and having a flange extending from said first surface for preventing blocked air flow to said inflatable bladder.

2. The article of footwear of claim 1, wherein said inflation chamber of said inflation mechanism is defined by a thermoplastic bulb.

3. The article of footwear of claim 1, wherein said inflation chamber of said inflation mechanism is defined by two thermoplastic sheets.

4. The article of footwear of claim 1, wherein said inflation mechanism includes a foam core.

5. The article of footwear of claim 1, wherein said inflation mechanism is positioned so as to be automatically operated by the downward pressure of a wearer's foot.

6. The article of footwear of claim 1, wherein said inflation mechanism is positioned on an exterior surface of said article of footwear so as to be manually operated by a wearer.

7. The article of footwear of claim 1, wherein said seating further includes a second surface, opposite said first surface, against which a flange of said umbrella valve forms a removable air tight seal.

8. The article of footwear of claim 7, wherein said seating includes at least one flange extending from said second surface.

9. The article of footwear of claim 7, wherein said seating includes at least one intake channel adjacent said stem aperture, wherein said at least one intake channel is under said flange of said umbrella valve.

10. The article of footwear of claim 1, wherein said stem includes at least one stem channel therein providing an air flow pathway through said seating.

11. The article of footwear of claim 7, wherein said second surface of said seating defines an interior surface of said inflatable bladder.

12. The article of footwear of claim 1, further comprising a filter positioned between said inflation chamber of said inflation mechanism and said umbrella valve.

13. The article of footwear of claim 12, wherein said filter does not release particulates.

14. The article of footwear of claim 13, wherein said filter is non-woven.

15. An article of footwear, comprising:
   an inflatable bladder substantially defined by a first and second sheet of thermoplastic material;
   an inflation mechanism fluidly connected to said inflatable bladder, said inflation mechanism including an inflation chamber, wherein said inflation chamber is at least partially defined by a third sheet of thermoplastic material; and
   an outlet valve, said outlet valve including a seating, said seating having a first surface defining a portion of said inflation chamber and a second surface defining a portion of said inflatable bladder, and said seating having an aperture for controlled air movement through said outlet valve and a flange extending from said first surface for preventing blocked air flow to said aperture.

16. The article of footwear of claim 15, wherein said seating includes a first flange extending from said first surface and a second flange extending from said second surface to avoid blocking air flow to said aperture.

17. The article of footwear of claim 15, wherein said outlet valve further includes an umbrella valve positioned within said aperture of said seating.

18. The article of footwear of claim 15, further comprising a filter positioned between said inflation chamber and said aperture, so as to prevent particulates from compromising said controlled air movement.

19. The article of footwear of claim 18, wherein said filter is positioned within an inlet cap, said cap including at least one hole therein for the transfer of air from said inflation chamber of said inflation mechanism to said aperture in said seating of said outlet valve via said filter.

* * * * *